United States Patent
Li et al.

(10) Patent No.: US 11,876,209 B2
(45) Date of Patent: Jan. 16, 2024

(54) PRE-LITHIATED LITHIUM ION POSITIVE ELECTRODE MATERIAL, AND PREPARATION METHOD THEREFOR AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN)

(72) Inventors: Bin Li, Foshan (CN); Dingshan Ruan, Foshan (CN); Linlin Mao, Foshan (CN); Shenghe Tang, Foshan (CN); Xingyu Wu, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO. LTD., Changsha (CN)

( * ) Notice: Subject to any disclaimer, the term of this patent is extended or adjusted under 35 U.S.C. 154(b) by 44 days.

(21) Appl. No.: 18/007,261

(22) PCT Filed: Jul. 29, 2021

(86) PCT No.: PCT/CN2021/109104
§ 371 (c)(1),
(2) Date: Jan. 27, 2023

(87) PCT Pub. No.: WO2022/022605
PCT Pub. Date: Feb. 3, 2022

(65) Prior Publication Data
US 2023/0327071 A1 Oct. 12, 2023

(30) Foreign Application Priority Data
Jul. 30, 2020 (CN) .......................... 202010753735.7

(51) Int. Cl.
*H01M 4/04* (2006.01)
*H01M 4/525* (2010.01)
*H01M 10/0525* (2010.01)
*H01M 4/505* (2010.01)
*H01M 4/02* (2006.01)

(52) U.S. Cl.
CPC ......... *H01M 4/0452* (2013.01); *H01M 4/505* (2013.01); *H01M 4/525* (2013.01); *H01M 10/0525* (2013.01); *H01M 2004/028* (2013.01)

(58) Field of Classification Search
CPC ..... H01M 4/505; H01M 4/525; H01M 4/0452
See application file for complete search history.

(56) References Cited

U.S. PATENT DOCUMENTS 10,164,249 B2   12/2018   Fang et al.
2013/0309561 A1  11/2013  Chen et al.

FOREIGN PATENT DOCUMENTS

| CN | 1773763 A | 5/2006 |
|---|---|---|
| CN | 103500827 A | 1/2014 |
| CN | 105024052 A | 11/2015 |
| CN | 109873129 A | 6/2016 |
| CN | 106058168 A | 10/2016 |
| CN | 106299319 A | 1/2017 |
| CN | 107248567 A | 10/2017 |
| CN | 109346705 A | 2/2019 |
| CN | 11799457 A | 10/2020 |
| CN | 11799457 B | 10/2022 |
| WO | 2022022605 A1 | 2/2022 |

OTHER PUBLICATIONS

First Office Action in Chinese Application 2020107537357 dated Mar. 3, 2022.
Notification to Grant Patent Right for Invention in Chinese Application 2020107537357 dated Aug. 19, 2022.
International Search Report and Written Opinion in PCT/CN2021/109104 dated Oct. 19, 2021.

*Primary Examiner* — Nathanael T Zemui
(74) *Attorney, Agent, or Firm* — Buchalter; Jason W. Croft

(57) ABSTRACT

Disclosed are a pre-lithiated lithium ion positive electrode material, a preparation method therefor and use thereof. The lithium ion positive electrode material has a chemical formula of $Li_2O/[A_{(3-x)}Me_x]_{1/3}\text{-}LiAO_2$, wherein A comprises M, and wherein M is at least one of Ni, Co, and Mn; and wherein Me is at least one of Ni, Mn, Al, Mg, Ti, Zr, Y, Mo, W, Na, Ce, Cr, Zn or Fe; and wherein $0<x<0.1$. The material is co-doped with multiple elements, and these elements act synergistically to inhibit the irreversible phase change at a high voltage and improve the stability of the structure of a substrate. The spinel phase $A_{(3-x)}Me_xO_4$ structure contains the doping elements, which work together to improve the interfacial activity of the material and introduce more electrochemically active sites.

10 Claims, 3 Drawing Sheets

PRE-LITHIATED LITHIUM ION POSITIVE ELECTRODE MATERIAL, AND PREPARATION METHOD THEREFOR AND USE THEREOF

CROSS-REFERENCE TO RELATED APPLICATIONS

The present application is a national phase entry under 35 USC § 371 of International Application PCT/CN2021/109104, filed Jul. 29, 2021, which claims the benefit of and priority to Chinese Patent Application No. 2020107537357, filed Jul. 30, 2020, the entire disclosures of which are incorporated herein by reference.

TECHNICAL FIELD

The disclosure belongs to the field of lithium ion battery, and in particular relates to a pre-lithiated lithium ion positive electrode material, a preparation method therefor and use thereof.

BACKGROUND

Lithium ion battery has become a main solution for mobile energy source due to the outstanding advantages, such as a high energy density, a low self-discharge, and no memory effect, and have been widely applied in many fields, such as mobile phone, tablet, electric vehicle, drone, and energy storage. With the promotion of thinner and more durable lithium ion batteries, not only are the lithium ion batteries required to have a higher energy density, but also new requirements are put forward for the safety performance. For example, with the accelerated upgrading of products such as mobile phone and electric vehicle as well as the configuration, lithium ion batteries are required to have a higher energy density and a higher safety performance.

Lithium ion battery include lithium cobaltate, lithium manganate, lithium nickelate, lithium nickel cobalt manganese oxide, lithium iron phosphate, etc. Currently, a larger capacity loss will occur in lithium ion battery during a first charge-discharge process, which is not conducive to improving the energy density of lithium ion battery. For example, a lithium ion battery prepared by an existing lithium ion layered material has a first discharge capacity much smaller than a first charge capacity after experiencing the first charge-discharge process, and thus the capacity retention rate is relatively low. It is mainly because in the environment of the first charge-discharge, the rate of lithium being extracted from the positive electrode material is greater than the rate at which the lithium being inserted into the negative electrode material. It is hard for the lithium ions to be quickly inserted at the negative electrode interface, and some of the active lithium undergoes a side reaction on the negative electrode surface to form an solid electrolyte phase interface (SEI) film, causing reduced active lithium, along with other side reactions, which together cause an irreversible capacity loss of the lithium ion battery, thereby reducing the discharge capacity and thus the energy density. In addition, it is still one of the difficulties in the art to obtain a lithium ion battery that has both a high energy density and a high safety. In the prior art, for some lithium ion batteries, the first discharge capacity is increased by adding lithium to the negative electrode; however, the addition of lithium to the negative electrode of the battery may reduce the battery compatibility, and the method by adding lithium would not conducive to improving the safety performance.

Therefore, it is very desirable to obtain a lithium ion battery that has both a high energy density and a high safety performance.

SUMMARY

An objective of the disclosure is to provide a pre-lithiated lithium ion positive electrode material, a preparation method therefor and use thereof. The pre-lithiated lithium ion positive electrode material has an excellent first discharge capacity, a high voltage resistance, and a long cycle life and a high rate capability.

In order to achieve the above objective, the disclosure adopts the following technical solutions.

A pre-lithiated lithium ion positive electrode material is provided, which has a chemical formula of $Li_2O/[A_{(3-x)}Me_x]_{1/3}$-$LiAO_2$, wherein A comprises M, and wherein M is at least one of Ni, Co, and Mn; and wherein Me is at least one of Ni, Mn, Al, Mg, Ti, Zr, Y, Mo, W, Na, Ce, Cr, Zn or Fe; and wherein $0<x<0.1$.

Preferably, A further comprises M', and wherein M' is at least one of Mg, Ti, Zr, Y, Ce, Sr, La or Al.

More preferably, M' is at least three of Mg, Ti, Zr, Y, Ce, Sr, La or Al.

Preferably, the mass ratio of M' to M is 1:(100-1000).

Preferably, $LiAO_2$ is at least one of $LiNi_{(1-m-n)}Co_nMn_mO_2$, with $0 \leq m \leq 1$ and $0 \leq n \leq 1$.

A method for preparing the pre-lithiated lithium ion positive electrode material is provided, which comprises the following steps:

(1) preparing a sulfate solution of A, then adding a precipitant and a complexing agent, and stirring and reacting to obtain a precursor slurry;

(2) subjecting the precursor slurry to centrifugation, drying, and sieving to obtain a precursor;

(3) mixing a lithium source with the precursor, and calcining and crushing to obtain a lithium ion positive electrode material; and (4) adding the lithium ion positive electrode material to a pre-lithiation solution, and stirring, aging, drying, and tempering to obtain $Li_2O/[A_{(3-x)}Me_x]_{1/3}$-$LiAO_2$, wherein the pre-lithiation solution comprises: a lithium source, Me and a conjugate, wherein Me is at least one of Ni, Mn, Al, Mg, Ti, Zr, Y, Mo, W, Na, Ce, Cr, Zn or Fe; and the conjugate is a naphthalene-containing conjugate, citric acid conjugate or tartaric acid conjugate containing a hydroxyl+carboxyl combination, a carboxyl+carbon-carbon double bond combination, a hydroxyl+carbon-carbon double bond combination, a hydroxyl+carboxyl+carbon-carbon double bond combination, or a carbon-carbon double bond+carbonyl combination, among others.

Preferably, the naphthalene-containing conjugate is at least one of naphthalene, naphthoquinone, naphthalene sulfonic acid, naphthalene sulfuric acid, naphthalene nitric acid, naphthalene boric acid, or naphthalene titanic acid.

Other methods which allow the pre-lithiation treatment to form an $Li_2O/[A_{(3-x)}Me_x]_{1/3}$ complex in the surface layer, and then the generation of a spinel phase $A_{(3-x)}Me_xO_4$ structure protective layer in the surface layer during the first charge and discharge process, such as, spray drying pretreatment method, co-evaporation pretreatment method, magnetron sputtering pretreatment method, are encompassed in the scope of the disclosure.

Preferably, the precipitant in step (1) is sodium hydroxide.

Preferably, the complexing agent in step (1) is aqueous ammonia.

Preferably, in step (1), the temperature for reacting is 45-65° C., the reaction time is 15-35 hours, and the reaction atmosphere is an inert gas.

Preferably, the rotation speed of the stirring in step (1) is 300-500 rpm.

Preferably, the pH for reacting in step (1) is 8-12.

Preferably, in step (2), the temperature of the drying is 110-120° C., and the drying time is 8-10 hours.

Preferably, the lithium source in step (3) is at least one of lithium carbonate, lithium oxide or lithium hydroxide.

Preferably, in step (3), the molar ratio of Li in the lithium source to the element A in the precursor is (1.01-1.07):1, wherein M' in A is a doping element, and the source of M' is at least one of a metal powder, oxide, fluoride, hydroxide, phosphate, or carbonate containing the element.

Preferably, the calcining in step (3) is divided into two temperature sections, involving first calcining at 700-850° C. for 4-8 h, and then sintering at 950-1150° C. for 8-12 h.

Preferably, a method for preparing the pre-lithiation solution in step (4) comprises the following step: adding a conjugate, a lithium source and Me to an aqueous solution, and stirring to obtain the pre-lithiation solution.

More preferably, the aqueous solution is one or more of a nitric acid solution, a sulfuric acid solution, a sodium hydroxide solution or an ethanol solution.

Preferably, in step (4), the temperature for tempering is 500-600° C., and the tempering time is 30-60 min.

Preferably, what is obtained after the tempering in step (4) is a lithium ion positive electrode material with a pretreated layer, and the pretreated layer is $Li_2O/[A_{(3-x)}Me_x]_{1/3}$ ($0<X<0.1$).

The disclosure further provides a method for preparing the pre-lithiated lithium ion positive electrode material, specifically comprising the following steps:

(1) preparing a sulfate solution of M and M', then adding a precipitant and a complexing agent, and stirring and reacting to obtain a precursor slurry;

(2) subjecting the precursor slurry to centrifugation, drying, and sieving to obtain an M'-doped bulk phase precursor;

(3) mixing a lithium source with the M'-doped bulk phase precursor, and calcining and crushing to obtain a lithium ion positive electrode material; and (4) adding the lithium ion positive electrode material to a pre-lithiation solution, and stirring, aging, drying, and tempering to obtain $Li_2O/[A_{(3-x)}Me_x]_{1/3}$-$LiAO_2$, wherein the pre-lithiation solution comprises: a lithium source, Me and a conjugate, wherein Me is at least one of Ni, Mn, Al, Mg, Ti, Zr, Y, Mo, W, Na, Ce, Cr, Zn or Fe; and the conjugate is a naphthalene-containing conjugate, citric acid conjugate or tartaric acid conjugate containing a hydroxyl+carboxyl combination, a carboxyl+carbon-carbon double bond combination, a hydroxyl+carbon-carbon double bond combination, a hydroxyl+carboxyl+carbon-carbon double bond combination, or a carbon-carbon double bond+carbonyl combination.

The above-mentioned element M' doping is for a bulk phase, and thus the bulk phase precursor is produced, which is for the purpose of suppressing irreversible phase change at a high voltage and reducing microcracks. The use of multi-element precursor doping is intended to give play to the advantages of each element and improve the doping effect.

Mechanism of the Invention: When additional lithium ions are introduced into $LiMO_2$, continuous electrochemical conversion occurs to form an $Li_2O/M$ composite material ($LiMO_2+3Li^++3e^-\rightarrow 2Li_2O+M$) on the surface layer. This reaction starts from the surface of $LiMO_2$ particles to generate a small amount of $Li_2O/M$ shell at the interface, which gradually penetrates towards the inside. The residual naphthalene or other pretreatment additives in the $LiMO_2$ positive electrode material are easy to remove during the treatment process. As long as the active lithium is introduced into the shallow surface layer of the $LiMO_2$ positive electrode material through a simple process, a high pre-lithiation efficiency is provided for the realized pre-lithiated material ($Li_2O/M$). The content of the $Li_2O/[M_{(3-x)}Me_x]_{1/3}$ ($0<x<0.1$) complex in $LiMO_2$ can be adjusted by adjusting the initial amounts of $LiMO_2$ and lithium-naphthalene-Me. Lithium and a negatively charged organic ligand, using a chemical reaction of a naphthalene-lithium-Me solution to $LiMO_2$, results in the conversion of lithium in the naphthalene-lithium-Me (Me refers to an added element) solution into a CS composite nanolayer in the $LiMO_2$ shallow layer, thereby forming CS-$LiMO_2$ (CS represents $Li_2O/[M_{(3-x)}Me_x]_{1/3}$). In addition, the pre-lithiated $LiMO_2$ is compatible with the current battery manufacturing process; and the simple solution chemical pre-lithiation route avoids the complicated operation process of electrochemical pre-lithiation, and thus providing a high efficiency as compared to the synthesis and use of a single positive electrode pre-lithiation reagent. This mechanism is also applicable to doped and modified $LiAO_2$, resulting in CS-$LiAO_2$ (CS represents $Li_2O/[A_{(3-x)}Me_x]_{1/3}$) being finally formed.

Compared with conventional $LiMO_2$ positive electrode materials with layered two-dimensional channels, the positive electrode material provided by the disclosure has a shallow surface layer being capable of forming a spinel phase $A_{(3-x)}Me_x$ structure. Firstly, the spinel phase structure has three-dimensional de-intercalation and intercalation lithium channels, thereby significantly increasing the diffusion path of lithium ions and improving the rate performance of the positive electrode material. Secondly, the spinel phase structure can also provide more active sites for electrochemical reactions, thereby effectively increasing the active specific surface area suitable for lithium ion de-intercalation reactions; and the spinel structure has high pressure resistance characteristics, thereby improving the cycle performance.

Beneficial Effects

1. The positive electrode material of the disclosure is co-doped with multiple elements (Mg, Ti, Zr, Y, Ce, Sr, La or Al), and these elements act synergistically to inhibit irreversible phase change under a high voltage and improve the stability of the structure of a substrate; and the spinel phase $A_{(3-x)}Me_xO_4$ structure contains doping elements, which work together to improve the interfacial activity of the material and introduce more electrochemically active sites.

2. By introducing the naphthalene-containing substance having hydroxyl+carboxyl, carboxyl+carbon-carbon double bond, hydroxyl+carbon-carbon double bond, or hydroxyl+carboxyl+carbon-carbon double bond, it is provided with a good ability to bind with lithium and Me, thereby greatly improving lithium binding ability.

3. By means of the pre-lithiation treatment of the surface layer, an $Li_2O/[A_{(3-x)}Me_x]_{1/3}$ ($0<X<$complex "donor" is produced on the $LiAO_2$ surface to increase the capacity, and this substance will produce free lithium during the first charge-discharge process, which can make up for the lithium loss caused by the side reactions during the first charge-discharge process, and can increase the first discharge capacity, thereby increasing the overall energy density;

4. When the lithium battery positive electrode material is manufactured into a battery, during the first charge-discharge process, the $Li_2O/[A_{(3-x)}Me_x]_{1/3}$ (0<x<0.1) complex containing Me on the surface of $LiAO_2$ is converted into spinel-like $A_{(3-x)}Me_xO_4$ after the charge-discharge. The spinel phase structure has three-dimensional de-intercalation and intercalation lithium channels, which are more conducive to the diffusion and migration of lithium ions as compared to ordinary layered two-dimensional structures. The spinel-like $A_{(3-x)}Me_xO_4$ has high-voltage resistance, which can improve the high-voltage performance of the material;

5. When the lithium battery positive electrode material is manufactured into a battery, the lithium ion "donor" capacity is high during the initial charge process, the cycle life or rate capability of the lithium ions will not be negatively affected, and the degree of pre-lithiation is controllable. Furthermore, the material has a good compatibility with existing battery manufacturing processes, including slurry manufacturing, electrode drying, and battery assembly; and the raw material processing is simple and has a low cost and a high safety.

DETAILED DESCRIPTION

Figure 1:
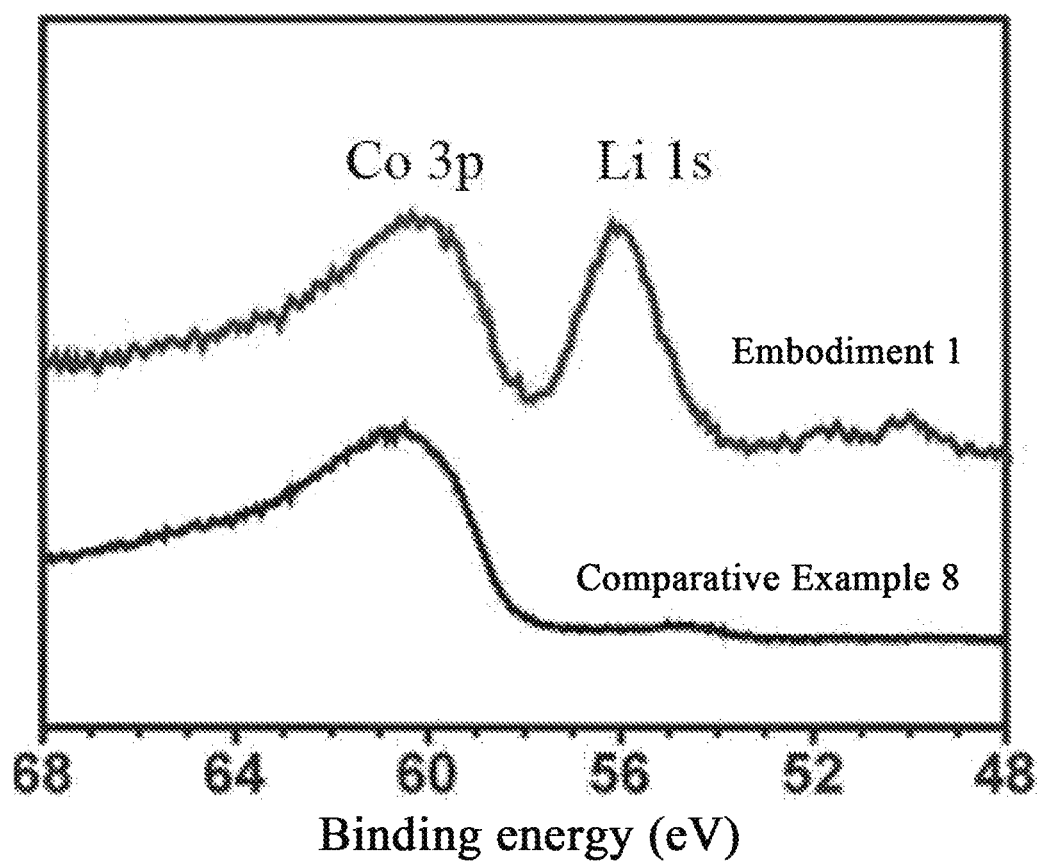
FIG. 1 is an XPS pattern of the pre-lithiated sample of Embodiment 1 and the sample of Comparative Example 8 without a pre-lithiation treatment.

In order to make those skilled in the art more clearly understand the technical solution of the disclosure, the following embodiments are set forth for description. It should be noted that the following embodiments do not constitute a limitation on the protection scope of the disclosure.

Unless otherwise specially stated, the raw materials, reagents or devices used in the following embodiments can all be obtained from conventional commercial sources, or can be obtained by existing known methods.

The disclosure adopts the following preparation method to synthesize a positive electrode material, wherein the positive electrode material can be simply described as: a material comprising a bulk phase doped with Al, Mg and Zr and a shallow layer doped with Al and Ti (the molar ratios of doping elements Al and Ti to Co in the shallow layer are respectively 0.5% and 0.25%). It should be noted that the "molar ratio" refers to the ratio of the moles of Al and Ti atoms participating in the reaction to the moles of Co atoms participating in the reaction. For example, the expression "the molar ratios of Al and Ti to Co are respectively 0.5% and 0.25%" means that for 1 mol of $LiCoO_2$, 0.25 mol of $Al_2O_3$ and 0.25% mol of $TiO_2$ are used for reaction therewith.

Embodiment 1

The pre-lithiated lithium ion positive electrode material of Embodiment 1 has a chemical formula of $(Li_2O/[Co_{2.95}(TiAl)_{0.05}]_{1/3})_{0.01} \cdot (Li_{1.01}Co_{0.96}Mg_{0.008}Al_{0.024}Zr_{0.008}O_2)_{0.99}$.

A pre-lithiation solution (a solution containing naphthalene-lithium-Me) is prepared by mixing naphthalene, lithium carbonate, and Al and Ti, then adding a sulfuric acid solution, and stirring, wherein the naphthalene and the lithium carbonate are mixed at a molar ratio of 2:1.

A method for preparing the pre-lithiated lithium ion positive electrode material comprises the following steps:

(1) preparing 200 L of cobalt sulfate solution with a concentration of 0.4 mol/L, preparing 6.25 L of magnesium sulfate solution with a concentration of 0.1 mol/L, preparing 9.0 L of aluminum sulfate with a concentration of 0.2 mol/L, preparing 6.25 L of zirconium sulfate with a concentration of 0.1 mol, mixing, adding 30% liquid caustic soda and 25% analytically pure aqueous ammonia, stirring at a rate of 300 rpm, controlling the pH to 10.8, and reacting at 55° C. for 20 hours to obtain a precursor slurry;

(2) subjecting the precursor slurry to centrifugation, washing, filtration, drying at 110° C. for 8 h, and then sieving to obtain a spheroid precursor doped with magnesium, aluminum and zirconium;

(3) mixing the spheroid precursor doped with magnesium, aluminum and zirconium with lithium carbonate at a molar ratio of Li:(Co+Mg+Al+Zr) of 1.04:1 to obtain a mixture, calcining the mixture in air at 720° C. for 4 h, then sintering at 1035° C. for 8 h, and crushing to obtain a lithium cobaltate positive electrode material doped with Mg, Al and Zr; and (4) adding the lithium cobaltate positive electrode material doped with Mg, Al and Zr to a pre-lithiation solution, stirring for 5 minutes, and then subjecting to aging, drying, and tempering at 500° C. for 30 min to obtain a lithium ion positive electrode material with a pretreated layer N1, namely $(Li_2O/[Co_{2.95}(TiAl)_{0.05}]_{1/3})_{0.01} \cdot (Li_{1.01}Co_{0.96}Mg_{0.008}Al_{0.024}Zr_{0.008}O_2)_{0.99}$.

Embodiment 2

The pre-lithiated lithium ion positive electrode material of Embodiment 2 has a chemical formula of $(Li_2O/[Co_{2.94}(TiAl)_{0.06}]_{1/3})_{0.02} \cdot (Li_{1.01}CO_{0.96}Mg_{0.008}Al_{0.024}Y_{0.008}O_2)_{0.98}$.

The preparation method is roughly the same as in Embodiment 1, and the main difference lies in that in Embodiment 2, the doping elements in the precursor are magnesium, aluminum, and yttrium, the tempering temperature is 450° C., and the pretreated layer N2 produced from the pre-lithiation treatment has a total mass accounting for 2.0% of the total mass of the material.

Embodiment 3

The pre-lithiated lithium ion positive electrode material of Embodiment 3 has a chemical formula of $(Li_2O/[CO_{2.92}(TiAl)_{0.08}]_{1/3})_{0.015} \cdot (Li_{1.01}CO_{0.96}Mg_{0.008}Al_{0.02}Y_{0.008}Ti_{0.004}O_2)_{0.985}$.

The preparation method is roughly the same as in Embodiment 1, and the main difference lies in that in Embodiment 3, the doping elements in the precursor are magnesium, aluminum, yttrium and titanium, the tempering time is 1 h, and the pretreated layer N3 produced from the pre-lithiation treatment has a total mass accounting for 1.5% of the total mass of the material.

Embodiment 4

The preparation method is roughly the same as in Embodiment 1, and the main difference lies in that in Embodiment 4, the doping elements in the precursor are aluminum, yttrium and lanthanum with a ratio of Li:(Co+Y+La+Al)=1.05:1, and the pretreated layer N4 produced from the pre-lithiation treatment has a total mass accounting for 1.5% of the total mass of the material.

Embodiment 5

The preparation method is roughly the same method as in Embodiment 1, and the main difference lies in that the solution provided for the pretreatment in Embodiment 5 is naphthalene boric acid-lithium-Me.

Embodiment 6

The preparation method is roughly the same as in Embodiment 1, and the main difference lies in that in Embodiment 6, the precursor is nickel cobalt manganese hydroxide (Ni:Co:Mn=5:2:3), and the pretreated layer N6 produced from the pre-lithiation treatment has a total mass of the pretreated layer N6 accounting for 1.0% of the total mass of the material.

Embodiment 7

The preparation method is roughly the same as in Embodiment 1, and the main difference lies in that in Embodiment 7, the precursor is nickel hydroxide, the doping elements in the precursor are magnesium, manganese, and cobalt, and the pretreated layer N7 produced from the pre-lithiation treatment has a total mass of the pretreated layer N7 accounting for 4.5% of the total mass of the material.

Comparative Example 1

The lithium ion positive electrode material of Comparative Example 1 has a chemical formula of $Li_{1.01}Co_{0.96}Mg_{0.008}Al_{0.024}Zr_{0.008}O_2$.

A method for preparing the lithium ion positive electrode material is provided, which comprises the following steps:
(1) preparing 200 L of cobalt sulfate solution with a concentration of 0.4 mol/L, preparing 6.25 L of magnesium sulfate solution with a concentration of 0.1 mol/L, preparing 9.0 L of aluminum sulfate with a concentration of 0.2 mol/L, preparing 6.25 L of zirconium sulfate with a concentration of 0.1 mol, mixing, adding 30% liquid caustic soda and 25% analytically pure aqueous ammonia, stirring at a rate of 300 rpm, controlling the pH to 10.8, and reacting at 55° C. for 20 hours to obtain a precursor slurry;
(2) subjecting the precursor slurry to centrifugation, washing, filtration, drying at 110° C. for 8 h, and then sieving to obtain a spheroid precursor doped with magnesium, aluminum and zirconium; and
(3) mixing the spheroid precursor doped with magnesium, aluminum and zirconium with lithium carbonate at a molar ratio of Li:(Co+Mg+Al+Zr) of 1.04:1 to obtain a mixture, calcining the mixture in air at 720° C. for 4 h, then sintering at 1035° C. for 8 h, and crushing to obtain a lithium cobaltate positive electrode material doped with Zr, Mg and Al; and
(4) mixing the lithium cobaltate positive electrode material doped with Zr, Mg and Al with lithium carbonate, an aluminum salt, and a titanium salt, wherein the amounts of lithium, aluminum and titanium added are exactly the same as those in Embodiment 1, and tempering at 500° C. for 30 min to obtain the positive electrode material with the composition being $Li_{1.01}Co_{0.96}Mg_{0.008}Al_{0.024}Zr_{0.008}O_2 \cdot (N1')$, wherein N1' is a mixed coating layer composed of Li, Co, Al, Ti and O, and after direct tempering, the total mass of N1' accounts for 1.0% of the total mass of the material.

The difference between Embodiment 1 and Comparative Example 1 lies in that Comparative Example 1 has no surface layer pre-lithiation treatment, and relates to directly coating the same substance with a solid phase and then tempering and sintering to obtain a product.

Comparative Example 2 adopts roughly the same method as in Embodiment 2, and the difference lies in that Comparative Example 2 has no pre-lithiation treatment, and the material N2' produced from directly tempering accounts for 2.0% of the total mass after direct tempering.

Comparative Example 3 adopts roughly the same method as in Embodiment 3, and the difference lies in that Comparative Example 3 has no pre-lithiation treatment, and the material N3' produced from directly tempering accounts for 1.5% of the total mass after direct tempering.

Comparative Example 4 adopts roughly the same method as in Embodiment 4, and the difference lies in that Comparative Example 4 has no pre-lithiation treatment, and the material N4' produced from directly tempering accounts for 1.5% of the total mass after direct tempering.

Comparative Example 5 adopts roughly the same method as in Embodiment 5, and the difference lies in that no naphthalene boric acid is added to the provided solution, and the solution only contains lithium and Me.

Comparative Example 6 adopts roughly the same method as in Embodiment 6, and the difference lies in that Comparative Example 6 has no pre-lithiation treatment, and the material N6' produced from directly tempering accounts for 1.0% of the total mass after direct tempering.

Comparative Example 7 adopts roughly the same method as in Embodiment 7, and the difference lies in that Comparative Example 7 has no pre-lithiation treatment, and the material N7' produced from directly tempering accounts for 4.5% of the total mass after direct tempering.

In the above embodiments and examples, Na (a=1, 2, 3, ... ), Na' (a=1, 2, 3, ... ), wherein the Na and Na' are in a one-to-one correspondence.

Comparative Example 8

The lithium ion positive electrode material of Comparative Example 8 has a chemical formula of is $Li_{1.01}Co_{0.96}Mg_{0.008}Al_{0.024}Zr_{0.008}O_2$.

A method for preparing the lithium ion positive electrode material is provided, which comprises the following steps:
(1) preparing 200 L of cobalt sulfate solution with a concentration of 0.4 mol/L, preparing 6.25 L of magnesium sulfate solution with a concentration of 0.1 mol/L, preparing 9.0 L of aluminum sulfate with a concentration of 0.2 mol/L, preparing 6.25 L of zirconium sulfate with a concentration of 0.1 mol, mixing, adding 30% liquid caustic soda and 25% analytically pure aqueous ammonia, stirring at a rate of 300 rpm, controlling the pH to 10.8, and reacting at 55° C. for 20 hours to obtain a precursor slurry;

(2) subjecting the precursor slurry to centrifugation, washing, filtration, drying at 110° C. for 8 h, and then sieving to obtain a spheroid precursor doped with magnesium, aluminum and zirconium; and (3) mixing the spheroid precursor doped with magnesium, aluminum and zirconium with lithium carbonate at a molar ratio of Li:(Co+Mg+Al+Zr) of 1.04:1 to obtain a mixture, calcining the mixture in air at 720° C. for 4 h, then sintering at 1035° C. for 8 h, and crushing to obtain a lithium cobaltate positive electrode material doped with Zr, Mg and Al.

The difference between Embodiment 1 and Comparative Example 8 lies in that Comparative Example 8 has no surface layer pre-lithiation treatment.

Test Example

The positive electrode materials obtained in the embodiments and comparative examples are manufactured into batteries for several performance tests, specifically as follows.

The lithium cobaltate positive electrode materials respectively obtained in Embodiment 1 and Comparative Examples 8 and 1, polyvinylidene fluoride, and conductive carbon are mixed at a mass ratio of 90:5:5, NMP is added, and the support slurry is stirred, applied to an aluminum foil and dried at 60° C. to make positive electrode pieces. The positive electrode pieces, a lithium piece as a negative electrode, an electrolyte solution and a separator, as raw materials, are assembled into CR2430 button batteries in a glove box.

At room temperature, the charge-discharge capacity is tested at a charge-discharge voltage of 3.0-4.55 V and a first charge-discharge rate of 0.1 C. At 25° C., the cycle performance is tested at a charge-discharge voltage of 3.0-4.65 V and a charge rate of 0.5 C for 50 cycles. The cycle calculation starts from the 3rd cycle, and the 50-cycle capacity retention is determined by dividing the specific discharge capacity of the 52nd cycle by the specific discharge capacity of the 3rd cycle. The charge and discharge test results of the assembled button batteries of Embodiment 1 and Comparative Examples 8 and 1 are as shown below.

at 3.0-4.65 V/0.5 C of 75.6%. It can be seen from the comparison that Embodiment 1 is superior in both capacity and cycle.

The fast cycle decay of the sample of Comparative Example 8 is mainly due to the fact that the surface layer of the positive electrode material is not treated, which makes the surface layer be easily corroded during the cycles, and the structure is easily destroyed, which leads to a series of side reactions such as oxygen evolution, thus leading to the accelerated cycle decay. The sample of Comparative Example 1 has direct solid phase coating, wherein the surface layer is coated with an inert substance, which causes the blocked transport of ions and electrons and the decrease in capacity; furthermore, since the surface layer is coated with the inert substance, which provides a certain barrier effect between the positive electrode material and the electrolyte solution. Therefore, the cycle performance of the sample of Comparative Example 1 is improved as compared with that of Comparative Example 8.

Figure 2:
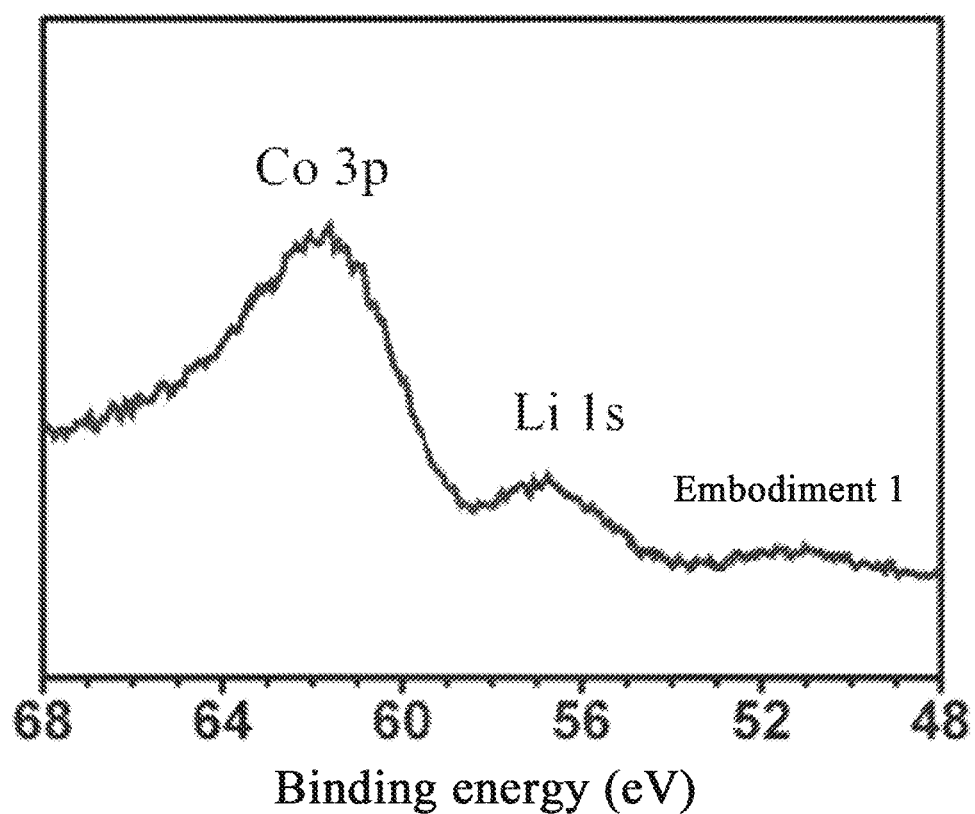
FIG. 2 is an XPS pattern of the sample of Embodiment 1 after the first charge-discharge.

As seen from FIG. 1, in the XPS pattern of the lithium cobaltate positive electrode material of Example 1 which has undergone the surface pretreatment, a 1s peak of Li is detected by XPS, indicating that lithium enters the material which has been treated in the naphthalene-lithium-Me-containing solution, making the surface layer or shallow layer of the material rich in lithium, whereas Comparative Example 8 which is not pre-treated does not contain a 1s peak of Li. It can be seen from FIG. 2 that after the first charge-discharge of Embodiment 1, the peak of L1s detected by XPS disappears, indicating that the lithium in the pre-treated surface or shallow layer is released during the first charge-discharge and replenishes the lithium battery system. It can be seen from FIG. 1 and FIG. 2 that Co 3p is basically unchanged, indicating that a stable spinel phase $Co_3O_4$ is formed in the surface layer after de-lithiation, and since the lithiation potential of $Co_3O_4$ is relatively low (<2 V), i.e. much less than 3.0 V, no lithium intercalation would occur subsequently in the $Co_3O_4$, so that it keeps present in the form of $Co_3O_4$. In addition, the other doping elements in the surface layer increase the electron ion conductance of the surface layer, improve the potential balance of the surface layer, and further improve the stability of the surface layer.

TABLE 1

| Example No. | Doping elements in bulk phase | Pre-lithiation treatment | Weight ratio of N or N' | 3.0-4.55 V/0.1 C, First discharge capacity (mAh/g) | 3.0-4.65 V/0.5 C, 50-cycle retention |
|---|---|---|---|---|---|
| Embodiment 1 | Mg, Al, Zr | Yes | N1 = 1.0% | 201.33 | 90.6% |
| Comparative Example 8 | Mg, Al, Zr | No | 0% | 199.62 | 30.2% |
| Comparative Example 1 | Mg, Al, Zr | No | N1' = 1.0% | 196.16 | 75.6% |

Figure 3:
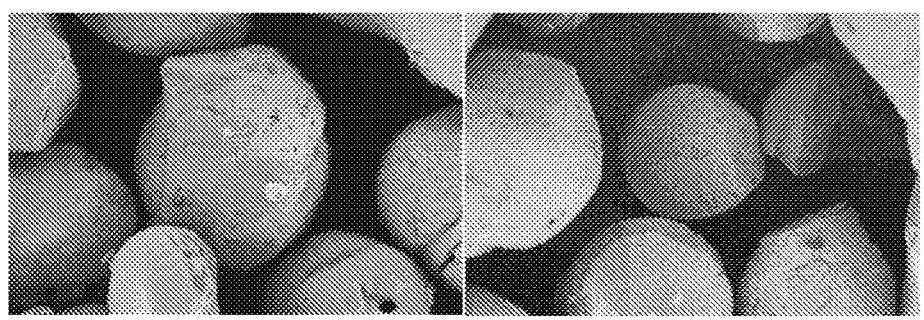
FIG. 3 is SEM images of the sample of Embodiment 1 and the sample of Comparative Example 8.

By comparing Embodiment 1 and Comparative Example 8, it can be seen that the first discharge capacity of the pre-lithiated sample of Example 1 at 3.0-4.55 V/0.1 C is 201.33 mAh/g, whereas the capacity of Comparative Example 8 without a pre-lithiation treatment is 199.16 mAh/g, so the capacity of Embodiment 1 is better. For the 50-cycle retention at 3.0-4.65 V/0.5 C, it can be seen that the 50-cycle capacity retention of Embodiment 1 is 90.6%, whereas that of Comparative Example 8 drops to 30.2%. The sample obtained by direct solid phase coating without pre-treatment in Comparative Example 1 has a first discharge capacity of 196.16 mAh/g and a 50-cycle capacity retention It can be seen from FIG. 3 that, in the left image representing the pretreated Embodiment 1, the surface layer is obviously indicated to have been pre-treated, while in the right image representing Comparative Example 8, the surface is smooth without obvious change.

Figure 4:
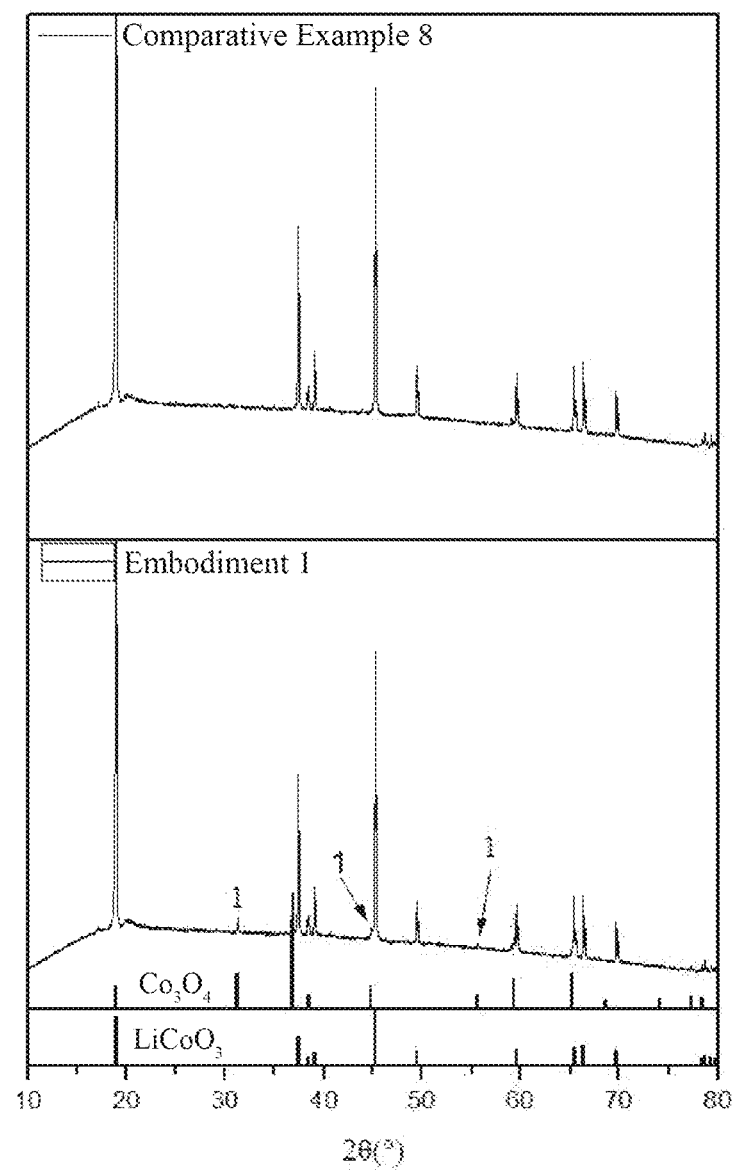
FIG. 4 is XRD patterns of the samples of Embodiment 1 and the sample of Comparative Example 8 after the first discharge.

It can be seen from FIG. 4 that after the first charge-discharge of Embodiment 1, the corresponding sample is mainly composed of a lithium cobaltate phase and also has a small amount of $Co_3O_4$ structure phase, indicating that during the first charge-discharge process, a spinel structure $Co_3O_4$ is formed on the particle surface, whereas for Comparative Example 8, after the first charge-discharge, the sample only has a lithium cobaltate phase.

The sample of Embodiment 1 has superior electrochemical performance, mainly for the following reasons: (1) after the surface layer of the positive electrode material is pre-lithiated, the lithium ion "donor" capacity is high during the initial charge process, which makes up for the lithium loss during the initial discharge process, thereby increasing the discharge capacity and thus the energy density; (2) the doped spinel structure $Co_{(3-x)}Me_xO_4$ is formed on the surface after the first discharge, and the spinel phase structure has three-dimensional de-intercalation and intercalation lithium channels, which are more conducive to the diffusion and migration of lithium ions as compared with ordinary layered two-dimensional structures; (3) the spinel phase structure and the doping metal elements work together to improve the interfacial activity of the material and introduce more electrochemically active sites; and (4) the doping metal elements in the surface of the positive electrode material also makes the interfacial properties more stable, thus ensuring the cycle stability.

The samples of Embodiments 2 and 3 and Comparative Examples 2 and 3 are tested at 25° C. for the capacity at a charge-discharge voltage of 3.0-4.55 V and a charge rate of 0.1 C and the cycle performance at a charge-discharge voltage of 3.0-4.65 V and a charge rate of 0.5 C for 50 cycles, and the 50-cycle capacity retention is determined by dividing the specific discharge capacity of the 52nd cycle by the specific discharge capacity of the 3rd cycle. The charge and discharge test results of the assembled button batteries of Embodiments 2 and 3 and Comparative Examples 2 and 3 are as shown below.

TABLE 2

| Example No. | Doping elements in bulk phase | Pre-lithiation treatment | Weight ratio of N or N' | 3.0-4.55 V/0.1 C, First discharge capacity (mAh/g) | 3.0-4.65 V/0.5 C, 50-cycle retention |
|---|---|---|---|---|---|
| Embodiment 2 | Mg, Al, Y | Yes | N2 = 2.0% | 200.2 | 89.6% |
| Embodiment 3 | Mg, Al, Y, Ti | Yes | N3 = 1.5% | 201.7 | 92.2% |
| Comparative Example 2 | Mg, Al, Y | No | N2' = 2.0% | 196.7 | 56.7% |
| Comparative Example 3 | Mg, Al, Y, Ti | No | N3' = 1.5% | 198.2 | 64.8% |

From the results of Embodiments 2 and 3, it can be seen that after the pre-lithiation treatment, the proportion of N increases, and the cycle decreases slightly. In the case of N1=1.5%, since the surface layer coating is thinner, the pretreatment effect is better. From the increase of the pretreated layer versus the capacity, it can be seen that as the proportion of the pretreated layer increases, the surface becomes thicker, resulting in the longer electron ion channels and the slightly decrease capacity. It can be seen from Comparative Example 2 and Comparative Example 3 that the capacity and cycle performance are significantly improved after pretreatment.

TABLE 3

| Example No. | Doping elements in bulk phase | Pre-lithiation treatment | Weight ratio of N or N' | Li: (Co + Me) | 3.0-4.55 V/0.1 C, First discharge capacity (mAh/g) | 3.0-4.65 V/0.5 C, 50-cycle retention |
|---|---|---|---|---|---|---|
| Embodiment 4 | Al, Y, La | Yes | N4 = 1.5% | 1.05:1 | 202.2 | 88.63% |
| Comparative Example 4 | Al, Y, La | No | N4' = 1.5% | 1.05:1 | 201.3 | 76.3% |

It can be seen from Table 3 that the cycle performance of the pre-lithiated sample (Example 4) is significantly better than that of the direct solid phase coated sample.

TABLE 4

| Example No. | Doping elements in bulk phase | Pre-lithiation solution | Weight ratio of N or N' | 3.0-4.55 V/0.1 C, First discharge capacity (mAh/g) | 3.0-4.65 V/0.5 C, 50-cycle retention |
|---|---|---|---|---|---|
| Embodiment 5 | Mg, Al, Zr | Naphthalene boric acid-lithium-Me | N5 = 1.0% | 202.4 | 91.2% |
| Comparative Example 5 | Mg, Al, Zr | Lithium-Me | N5' = 1.0% | 197.2 | 78.2% |

As shown in Table 4, Embodiment 5 has a better electrochemical performance as compared with Comparative Example 5. This is because lithium penetrates the surface layer of the material after the treatment with the pretreatment solution and interacts with the shallow layer of the substrate, making the shallow layer rich in lithium, and during the first charge-discharge process, the lithium-rich substance in the shallow layer can be converted to a spinel phase $Co_{(3-x)}Me_xO_4$ structure, which can stabilize the structure under a high voltage, improving the cycle performance; in addition, excess lithium after the pre-lithiation makes up for the lithium loss during the first charge-discharge process, thereby increasing the first discharge capacity.

The samples of Embodiment 6 and Comparative Example 6 are tested at 25° C. for the capacity at a charge-discharge voltage of 3.0-4.35 V and a charge rate of 0.1 C and the cycle performance at a charge-discharge rate of 1.0 C for 50 cycles. The cycle calculation starts from the 3rd cycle, and the capacity retention is determined by dividing the specific discharge capacity of the 52nd cycle by the specific discharge capacity of the 3rd cycle. The charge and discharge test results of the assembled button batteries of Embodiment 6 and Comparative Example 6 are as shown in Table 5 below.

The samples of Embodiment 7 and Comparative Example 7 doped with magnesium, manganese, and cobalt are tested at 25° C., with lithium nickelate as a substrate, for the capacity at a charge-discharge voltage of 2.8-4.25 V and a charge rate of 0.1 C at 25° C. and the cycle performance at a charge-discharge rate of 1.0 C for 100 cycles. The cycle calculation starts from the 3rd cycle, and the 100-cycle capacity retention is determined by dividing the specific discharge capacity of the 102nd cycle by the specific discharge capacity of the 3rd cycle. The charge and discharge test results of the assembled button batteries of Embodiment 7 and Comparative Example 7 are as shown in Table 6 below.

TABLE 6

| Example No. | Doping elements in bulk phase | Pre-lithiation solution | Weight ratio of N or N' | 3.0-4.55 V/0.1 C, First discharge capacity (mAh/g) | 3.0-4.65 V/0.5 C, 50-cycle retention |
|---|---|---|---|---|---|
| Embodiment 7 | Mg, Mn, Co | Naphthalene boric acid-lithium-Me | N7 = 4.5% | 216 | 78% |
| Comparative Example 7 | Mg, Mn, Co | Lithium-Me | N7' = 4.5% | 208 | 55% |

From the results of Embodiment 7 and Comparative Example 7, it can be seen that the capacity and cycle performance are both improved after pretreatment.

A detailed introduction to a pre-lithiated lithium ion positive electrode material provided by the disclosure, a preparation method therefor and use thereof according to the disclosure is provided above. The principles and implementations of the disclosure are explained by way of specific embodiments herein. The above embodiments are only provided to facilitate the understanding of the method of the disclosure and core concepts thereof, including the best mode, and also enables any person skilled in the art to practice the disclosure, including manufacturing and using any device or system, and implementing any combined

TABLE 5

| Example No. | Doping elements in bulk phase | Pre-lithiation solution | Weight ratio of N or N' | 3.0-4.55 V/0.1 C, First discharge capacity (mAh/g) | 3.0-4.65 V/0.5 C, 50-cycle retention |
|---|---|---|---|---|---|
| Embodiment 6 | Mg, Al, Zr | Naphthalene boric acid-lithium-Me | N6 = 1.0% | 180.5 | 91.2% |
| Comparative Example 6 | Mg, Al, Zr | Lithium-Me | N6' = 1.0% | 175.2 | 84.2% |

From the results of Embodiment 6 and Comparative Example 6, it can be seen that with lithium nickel cobalt manganese oxide (5:2:3) as a substrate, the capacity and cycle performance are both improved after pretreatment. This is because lithium enters the shallow layer of the particles after pretreatment and is released during the first discharge, which makes up for the loss of lithium during the first discharge and increases the capacity, and after lithium is released from the surface layer, the shallow structure is transformed from a layered structure into a spinel phase $Co_{(3-x)}Me_xO_4$ structure, which has three-dimensional de-intercalation and intercalation lithium channels, which are more conducive to the diffusion and migration of lithium ions as compared with ordinary layered two-dimensional structures; in addition, the spinel-like $M_{(3-x)}Me_xO_4$ has a high voltage resistance and improved cycle performance.

method. It should be noted that several improvements and modifications may be made by an ordinary person skilled in the art without departing from the principles of the present disclosure, and that such improvements and modifications also fall within the protection scope of the appended claims of the present disclosure. The scope of patent protection of the disclosure is defined by the claims, and other embodiments conceivable by those skilled in the art may be included. If these other embodiments have structural elements that are not different from the literal expressions of the claims, or if they include equivalent structural elements that are not substantially different from the literal expressions of the claims, these other embodiments should also be included within the scope of the claims.

The invention claimed is:

1. A pre-lithiated lithium ion positive electrode material, which has a chemical formula of $Li_2O/[A_{(3-x)}Me_x]_{1/3}$-$LiAO_2$, wherein A comprises M, and wherein M is at least one of Ni, Co, and Mn; and wherein Me is at least one of Ni, Mn, Al, Mg, Ti, Zr, Y, Mo, W, Na, Ce, Cr, Zn or Fe; and wherein $0<x<0.1$; wherein the lithium ion positive electrode material has a shallow surface layer being capable of forming a spinel phase $A_{(3-x)}Me_x$ structure.

2. The pre-lithiated lithium ion positive electrode material of claim 1, wherein A further comprises M', and wherein M' is at least one of Mg, Ti, Zr, Y, Ce, Sr, La or Al.

3. The pre-lithiated lithium ion positive electrode material of claim 1, wherein $LiAO_2$ in the $Li_2O/[A_{(3-x)}Me_x]_{1/3}$-$LiAO_2$ is $LiNi_{(1-m-n)}Co_nMn_mO_2$, with $0 \leq m \leq 1$ and $0 \leq n \leq 1$.

4. A method for preparing the pre-lithiated lithium ion positive electrode material of claim 1, comprising:
   (1) preparing a sulfate solution of A, then adding a precipitant and a complexing agent, and stirring and reacting to obtain a precursor slurry;
   (2) subjecting the precursor slurry to centrifugation, drying, and sieving to obtain a precursor;
   (3) mixing a lithium source with the precursor, and calcining and crushing to obtain a lithium ion positive electrode material; and
   (4) adding the lithium ion positive electrode material to a pre-lithiation solution, and stirring, aging, drying, and tempering to obtain $Li_2O/[A_{(3-x)}Me_x]_{1/3}$-$LiAO_2$, wherein the pre-lithiation solution comprises: a lithium source, Me and a conjugate, wherein Me is at least one of Ni, Mn, Al, Mg, Ti, Zr, Y, Mo, W, Na, Ce, Cr, Zn or Fe; and the conjugate is selected from a group consisting of a naphthalene-containing conjugate, citric acid conjugate or tartaric acid conjugate containing a hydroxyl+carboxyl combination, a carboxyl+carbon-carbon double bond combination, a hydroxyl+carbon-carbon double bond combination, a hydroxyl+carboxyl+carbon-carbon double bond combination, or a carbon-carbon double bond+carbonyl combination.

5. The method of claim 4, wherein the naphthalene-containing conjugate is at least one of naphthalene, naphthoquinone, naphthalene sulfonic acid, naphthalene sulfuric acid, naphthalene nitric acid, naphthalene boric acid, or naphthalene titanic acid.

6. The method of claim 4, wherein the lithium source in step (3) is at least one of lithium carbonate, lithium oxide or lithium hydroxide.

7. The method of claim 4, wherein in step (3), the molar ratio of Li in the lithium source to the element A in the precursor is (1.01-1.07):1, and wherein M' in A is a doping element, and the source of M' is at least one of a metal powder, oxide, fluoride, hydroxide, phosphate, or carbonate containing the element.

8. The method of claim 4, wherein pre-lithiation solution in step (4) is prepared by: adding a conjugate, a lithium source and Me to an aqueous solution, and stirring and dissolving.

9. The method of claim 8, wherein the aqueous solution is at least one of a nitric acid solution, a sulfuric acid solution, a sodium hydroxide solution or an ethanol solution.

10. A lithium ion battery, comprising the pre-lithiated lithium ion positive electrode material of claim 1.

* * * * *